United States Patent
Schifmann et al.

(10) Patent No.: US 11,985,260 B2
(45) Date of Patent: May 14, 2024

(54) METHOD TO UTILIZE MISMATCH SIZE TO PRODUCE ADDITIONAL STABLE BIT IN TILTING PUF

(71) Applicant: Birad—Research & Development Company Ltd., Ramat Gan (IL)

(72) Inventors: Yitzhak Schifmann, Bet Horon (IL); Joseph Shor, Tel Mond (IL)

(*) Notice: Subject to any disclaimer, the term of this patent is extended or adjusted under 35 U.S.C. 154(b) by 405 days.

(21) Appl. No.: 17/505,788

(22) Filed: Oct. 20, 2021

(65) Prior Publication Data

US 2022/0131713 A1 Apr. 28, 2022

Related U.S. Application Data

(60) Provisional application No. 63/105,365, filed on Oct. 26, 2020.

(51) Int. Cl.
*H04L 9/32* (2006.01)
*H04L 9/08* (2006.01)

(52) U.S. Cl.
CPC .......... *H04L 9/3278* (2013.01); *H04L 9/0866* (2013.01)

(58) Field of Classification Search
CPC .. H04L 9/3278; H04L 9/0866; H04L 2209/26
USPC .............................................................. 365/2
See application file for complete search history.

(56) References Cited

U.S. PATENT DOCUMENTS

| 9,279,850 | B1* | 3/2016 | Pedersen | G01R 27/2605 |
| 10,848,327 | B2* | 11/2020 | Shifman | H03K 19/00315 |
| 11,483,167 | B2* | 10/2022 | Suresh | G11C 7/24 |

* cited by examiner

*Primary Examiner* — Alexander Sofocleous
*Assistant Examiner* — Tracy R Hampton
(74) *Attorney, Agent, or Firm* — Dekel Patent Ltd.; David Klein

(57) ABSTRACT

A method for creating a physical unclonable function (PUF) bit for use with transistor circuitry includes performing a tilt test on a PUF cell of a transistor circuitry, comprising tilting the PUF cell at least once, and comparing a mismatch of a response of the PUF cell to a tilt threshold. A magnitude of the mismatch is determined. A mismatch magnitude below the tilt threshold is considered a first logic value" and a mismatch magnitude above the tilt threshold is considered a second logic value. The mismatch magnitude of the PUF cell is random. The absolute value of the mismatch magnitude is used as an entropy source to produce at least one PUF bit called a mirror PUF bit.

11 Claims, 11 Drawing Sheets

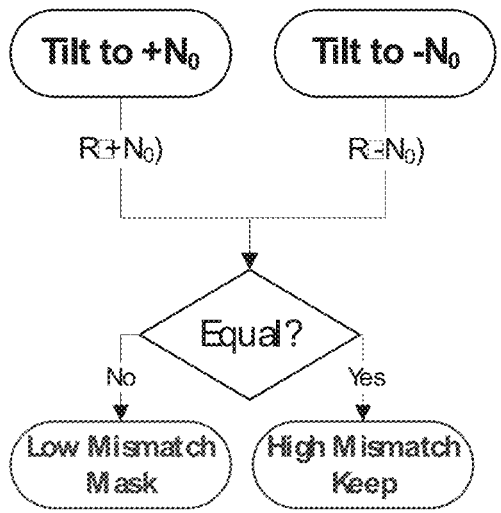
FIG. 1
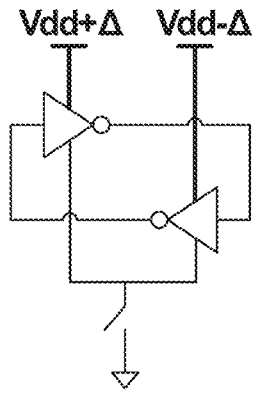
FIG. 2A - PRIOR ART
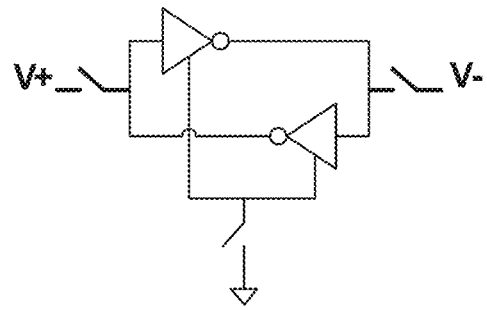
FIG. 2B - PRIOR ART
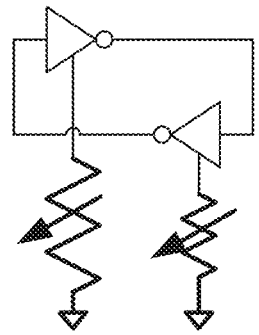
FIG. 2C - PRIOR ART
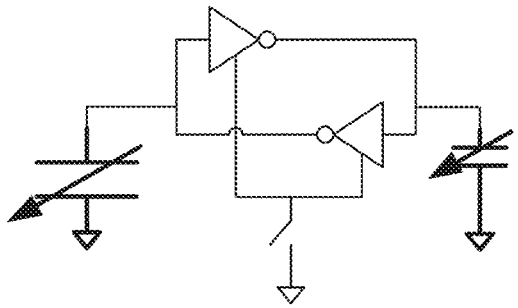
FIG. 2D - PRIOR ART

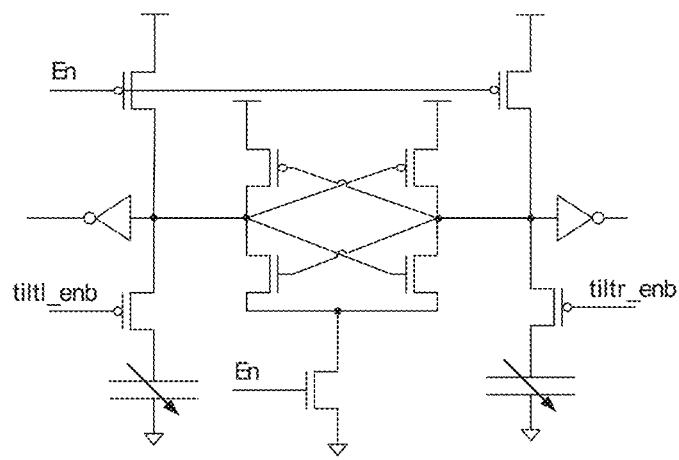
FIG. 7A
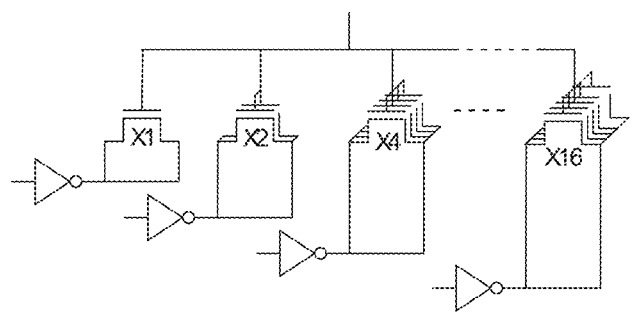
FIG. 7B
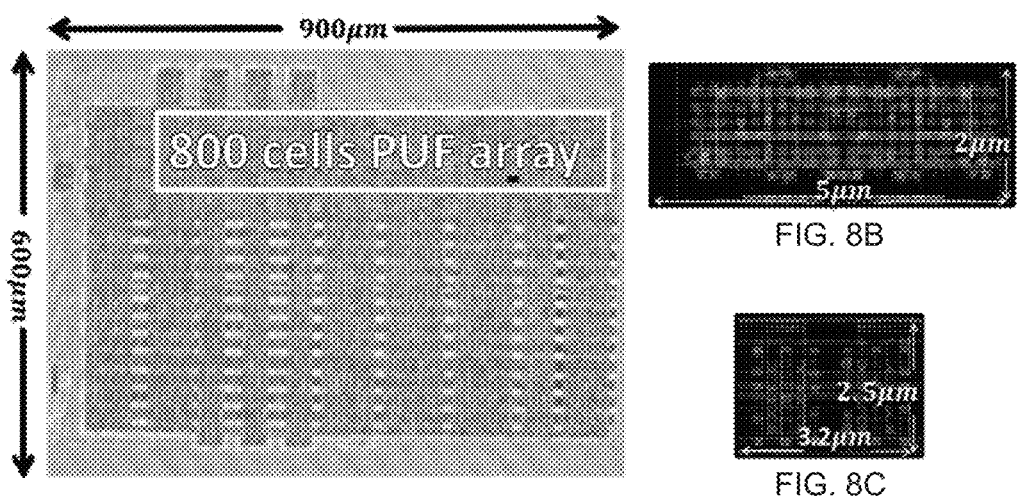
FIG. 8A
FIG. 8B
FIG. 8C

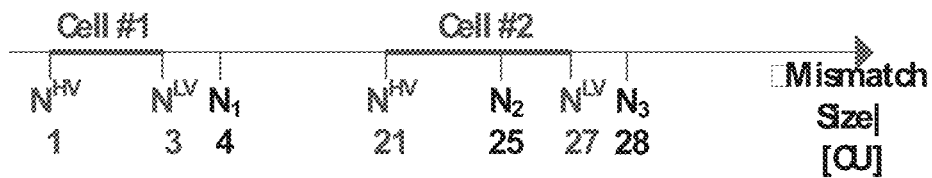
FIG. 17
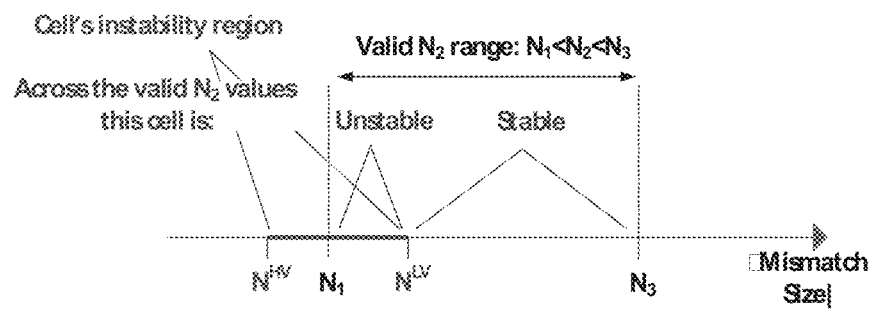
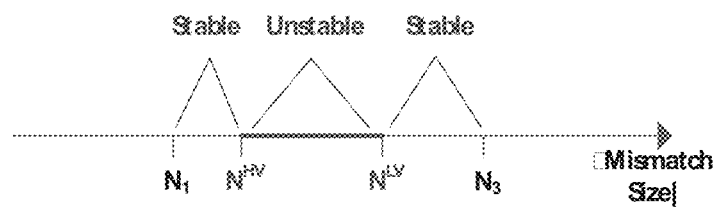
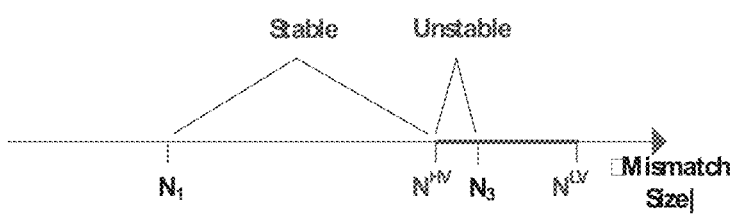
FIG. 18

METHOD TO UTILIZE MISMATCH SIZE TO PRODUCE ADDITIONAL STABLE BIT IN TILTING PUF

FIELD OF THE INVENTION

The present invention relates to Physical Unclonable Functions (PUFs), and particularly to a PUF that utilizes a preselection test, which measures the amount of mismatch within the PUF cell.

BACKGROUND OF THE INVENTION

The recent boost in popularity of mobile phones and IoT devices increases the demand for secure authentication of users and for secure and tamper-proof encryption keys generation, to enable a trustworthy data transmission. Physical Unclonable Functions (PUFs) are security primitives developed to answer these needs. Weak PUF circuits can generate a random and unique digital key. These keys are uncorrelated between different instances, and constant throughout the lifecycle of the device. Another class of PUFs, the strong PUF, generates a response for a given challenge. There are a large number of possible challenge/response pairs, which can enable accurate authentication. Herein, the weak PUF is discussed, and the term PUF refers here to weak PUFs only.

Typical weak PUF utilizations are chip identification and authentication, lightweight encryption and a source for encryption keys generation. Other usages have also been proposed, such as a lightweight protocol for private keys exchange, integration with standard encryption circuit such as AES to form a strong PUF and detection of Trojan hardware.

To generate the key, a PUF exploits the inevitable manufacturing mismatches between the individual devices comprising the circuit, and amplifies them to a digital output. This property makes the detection of the key by a malicious attacker very difficult. However, other factors such as operating conditions or noise may interfere with the circuit output, such that the generated key may be slightly different between subsequent evaluations. Consequently, many PUF architectures experience inherent stability problems.

Common PUF architectures include bistable PUFs, such as SRAM (static random access memory) and SRAM-based PUFs, ring oscillator PUFs, and Arbiter PUF, which is a strong PUF.

Bistable PUFs utilize the inherent mismatch within cross-coupled inverter pairs to generate the individual bits of the PUF key (also known as PUF response). The strengths of this PUF topology are that (1) it relies on well understood mechanisms, (2) it can be easily adapted to different fabrication processes and (3) it consumes relatively low power and utilizes a small area. Therefore, it is the most commonly used PUF architecture in commercial products. One of its major drawbacks, however, is the high native bits instability portion: about 20% of the bits may present instability across the applicable voltage and temperature (V/T) conditions. To increase the number of response bits, 1024 evaluation of each physical cell were conducted for each PUF cell in, such that a ternary PUF was demonstrated. If not all the evaluations resulted in the same response, a third response state was obtained. This, however, results in a high energy overhead, X1024, and a high BER, of 15%.

A common instability reduction technique is the preselection of stable bits. During preselection, a test is run over the PUF cells. A cell that passes the test is considered as stable and its response bit is qualified to participate in the PUF response, whereas cells that fail the test are disqualified and masked out of the response. Most of these tests are designed for bistable PUFs. Preselection tests could also be viewed as methods to measure the mismatch within the PUF cells, such that cells with low measured internal mismatch are potentially unstable cells.

SUMMARY OF THE INVENTION

The present invention seeks to provide a novel concept for Physical Unclonable Functions (PUFs), called the Mirror PUF. The Minor PUF can be applied to existing preselected PUF circuits by post-processing the preselection test results and has the potential to double the number of effective bits, with no additional area at the bit-cell level. The Minor PUF utilizes a preselection test, which measures the amount of mismatch within the PUF cell. This data is generally used to determine the mask for a conventional PUF. Here, it is used as an entropy source that is not correlated to the original response of the PUF. Bit-cells with low mismatch are considered as a '0' and cells with high mismatch as a '1'. A systematic method is shown for identifying unstable bits in the Mirror PUF response. It classifies the cells to 'low', 'medium' and 'high' mismatch, such that medium mismatch bits are considered as unstable and masked from the response. The concept was applied to a 65 nm Si implementation of the Capacitive Tilt PUF, as in U.S. patent Ser. No. 10/848,327. All of the unstable cells of the Minor PUF, except for 0.03%, were identified and masked, with a worst-case corner Bit Error-Rate (BER) of only 2.35E-5 and 0.00026% erroneous responses across all corners. The application of the Mirror PUF to the Capacitive tilt PUF increased the number of stable response bits by 66%. No observable correlation was found between the responses of the original PUF and the Mirror PUF.

BRIEF DESCRIPTION OF THE DRAWINGS

The present invention will be understood and appreciated more fully from the following detailed description, taken in conjunction with the drawings in which:

FIG. 1 is a simplified flow chart of a preselection test process.

FIGS. 2A-2D are simplified illustrations of prior art preselection PUF works, implemented on a bistable structure, by control of the supply level (FIG. 2A), differential precharge (FIG. 2B), manipulation of the discharge path (FIG. 2C), and difference in capacitance (FIG. 2D).

FIG. 7A illustrates the measured results of the Mirror PUF on the Capacitive Tilt PUF.

FIG. 7B illustrates variable capacitors that are MOS transistors, controlled by biasing the source and drain to $V_{ss}$ for inversion, a high capacitance or to $V_{cc}$ for depletion.

FIGS. 8A, 8B, and 8C illustrate an exemplary PUF of the invention fabricated in TSMC 65 nm in arrays of 800 bits, wherein FIG. 8A shows a die figure of the Capacitive Tilt PUF, FIG. 8B shows a layout of one PUF cell and FIG. 8C shows a layout of one capacitors bank.

FIG. 11A shows portions of Unstable-Qualified and Stable-Disqualified cells, and FIG. 11B shows Hamming Weight of the qualified cells.

FIGS. 12A-12C illustrate metrics from each measured chip, wherein FIG. 12A illustrates the Hamming Weight for the individual PUF arrays, FIG. 12B illustrates four qualified unstable cells found in four different arrays, and FIG. 12C illustrates the masking ratio for all the chips.

FIG. 17 illustrates "Instability range" examples for two cells. Cell #2, for example, has a relatively high mismatch. In a high Vcc, its mismatch is measured as 21 CU, and in a low Vcc, as 27 CU. Since the chosen $N_2$ is 25, this cell is unstable for the Mirror PUF. Cell #1, on the contrary, is a stable '0'.

FIG. 18 illustrates Different mismatch sizes of cells relative to $N_1$ and $N_3$. A cell could label with mismatch sizes between $N^{HV}$ and $N^{LV}$, depending on the V/T of $N_2$.\

DETAILED DESCRIPTION

Figure 3A:
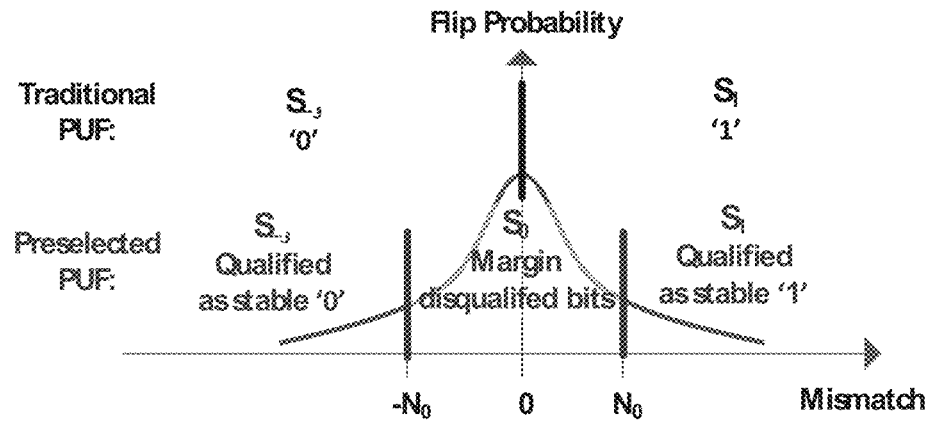
FIGS. 3A and 3B are simplified illustrations of segmentation of a traditional PUF and a preselected PUF, wherein in a preselected PUF, a margin segment is added, such that only bits with negligible probability to flip state are qualified for the PUF response (FIG. 3A, and a usage concept of the segmentation to generate another PUF bit (FIG. 3B).

I. Some Non-Limiting Features of the Invention

The invention uses preselection/mismatch measurement tests to utilize a new uncorrelated source of entropy within the PUF cells, such that:

1. A V/T immune post-processing scheme (that is, independent of voltage and temperature) is created, which significantly increases the number of bits extracted from the preselected PUF. The invention provides a systematic method of a new, energy-efficient PUF based on the mismatch data, just by post-processing existing PUF data, without changing the PUF architecture. This PUF is useful for any of the PUF applications discussed above.

2. The invention reuses the preselection test to preselect the unstable bits from the new PUF bits made available by the method. This preselection is also V/T immune and selects only the cells which are stable across all the V/Ts.

3. An implementation of this method on the Si implementation of a Capacitive Tilt PUF, in TSMC 65 nm, is presented. This implementation demonstrates 100% more raw data prior to preselection, and 66% more stable bits post preselection, on top of the existing PUF bits. In this implementation, the additional area/bit is zero at the bit-cell level and the energy for each of the new bits is 46 fJ. Of the cells which were found as unstable in the measurements, all were identified by the preselection test except for 0.03%. In the worst V/T, the measured BER was 2.35E-5 and only 0.00026% bit-errors were measured across all the V/Ts after the preselection. A user utilizing the capacitive tilt PUF could implement 40% less physical cells and achieve 0.0003% bit-errors.

In Section II, more details of embodiments of the invention are presented. In Section III, various implementation detail and system consideration are described, such as the stabilization method of the PUF. Section IV provides the measurements results of the PUF and compares it to prior art, and finally, in Section V non-limiting conclusions are presented.

II. New PUF Concept

A PUF cell is designed to have an equal probability to respond a '1' and a '0'. A preselection test induces a temporary intentional skew (also called tilt) within the cell, such that the probability of the response is tilted towards '1' or '0'. In a case where the induced tilt opposes the natural skew of the cell, which is ideally dictated only by the manufacturing mismatches, there is a conflict between these two effects. If the response of the tilted cell is unchanged by the tilt, the mismatch could be viewed as 'high'. Otherwise, the tilt overcomes the mismatch, and the mismatch is considered as 'low'. Put in different terms, the mismatch of the response of each of the PUF cells is compared to a tilt threshold, and a magnitude of the mismatch is determined. A mismatch below the tilt threshold is considered a first logic value (e.g., "zero") and a mismatch above the tilt threshold is considered a second logic value (e.g., "one"). The mismatch of each PUF cell is random, and an absolute value of the mismatch is independent of its sign. The mismatch magnitude is thus differentiated from the mismatch polarity. The mismatch magnitude (aka mismatch size) is the absolute value of the mismatch, while the polarity is the direction depends on the sign of the mismatch. The prior art capacitive tilt PUF patent (U.S. Pat. No. 10,848,327) utilizes the mismatch polarity to determine whether the PUF is a zero or one. For both a zero and one value, the valid prior-art tilt PUF cells have a relatively large mismatch magnitude.

Cells with low mismatch are regarded as unstable and masked from the overall PUF response. In practice, during the preselection test the cells are tilted twice, towards '1' and '0', and the responses are compared. If they are equal, the mismatch is stronger than the tilt and the cell is considered as stable. If they are different, the cell is deemed as unstable and masked from the response. FIG. 1 depicts a typical flowchart of the test, where $N_0$ is the tilt magnitude of the test and $R(\pm N_0)$ are the responses with tilt magnitudes of $+N_0$ and $-N_0$.

FIGS. 2A-2D illustrate four examples of PUF works with preselection tests which use a parameter $N_0$ to tilt the PUF, where the magnitude of $N_0$ can be controlled. These tests were implemented on an SRAM-based PUF architecture or similar, by manipulating the relative strengths of the cross coupled inverters, such that the one inverter is tilted towards '1' at its output and the second towards '0'. FIG. 2A exhibits voltage tilting, where $N_0$ is a small differential change in $V_{cc}$ between the inverters. In FIG. 2B, the internal nodes are precharged to a differential voltage of $N_0$. The resistance of the discharge path of one of the inverters was manipulated in FIG. 2C, while in FIG. 2D, $N_0$ is a variable capacitor added to one of the internal nodes. In all these tests, the magnitude of the tilt, $N_0$, is controllable, such that a user could select the desirable tilt magnitude to optimize the masking ratio (the ratio between disqualified bits to all of the bits). Therefore, these tests could be viewed as "mismatch measurement tests", where the size of the mismatch is quantified by the tilt magnitude ($N_0$) required to flip the result of the tilt test. For example, a bit-cell whose natural response is '1' and a tilt of $-N_0$ or lower flips its state, has a mismatch of $N_0$. A bit-cell whose natural response is '0' and a tilt of $N_0$ or higher flips its state, has a mismatch of $-N_0$.

In fact, in a traditional PUF without preselection, bit cells are divided to two disjoint segments, $S_{-1}$ and $S_1$, as depicted in FIG. 3A (top), according to their mismatch and their expected response. $S_1$ contains cells with positive mismatch. These are the cells which ideally respond '1', e.g., when no noise is present and the cell is evaluated only in one V/T condition. Cells with negative mismatch are in $S_{-1}$ and ideally respond '0'. The flip probability, in the Y axis of the figure, is the probability that a cell with positive mismatch appears, due to noise or V/T conditions as having a negative mismatch and responds '0', or vice versa[1]. The flip probability is higher when the absolute mismatch size is lower. The preselection adds a margin segment $S_0$ between these segments, as in the bottom of FIG. 3A. This segment contains cells which may flip state due to noise and V/T, such that in a preselected PUF $S_{-1}$ and $S_1$ contain only highly mismatched stable cells. Bit-cells with mismatch higher than $N_0$ are assigned to segment $S_1$ and are considered as stable '1'. Cells with mismatch lower than $-N_0$ are in $S^{-1}$ and are considered as stable '0'. The bits in $S_0$ are unstable or potentially unstable and therefore masked; i.e., they are not part of the original PUF response.

[1] Note that a cell may appear as having a positive mismatch in some V/Ts and a negative mismatch in others. In this aspect, we define the 'correct' response as the response of the typical V/T.

The PUF of the invention is based on the mismatch amount of each PUF cell being random, and the absolute value being independent of its sign. While the sign of the mismatch corresponds to the response of the cell, the absolute value of the mismatch (i.e., its size) does not. For example, a cell with a high positive mismatch responds '1', similarly to a cell with lower positive mismatch (ignoring noise effects). Therefore, it is proposed to utilize the size of the mismatch as an uncorrelated entropy source to generate an additional PUF bit.

In the reminder of this section, it is explained how the segmentation concept is used for the generation of another PUF bit. It is further shown that the new PUF response is not correlated to the original PUF. In section III.A the segmentation is expanded and a method to find the unstable bits of the new PUF is presented.

Figure 3B:
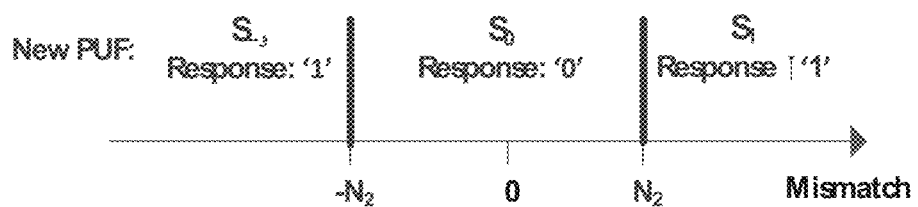
Figure 4:
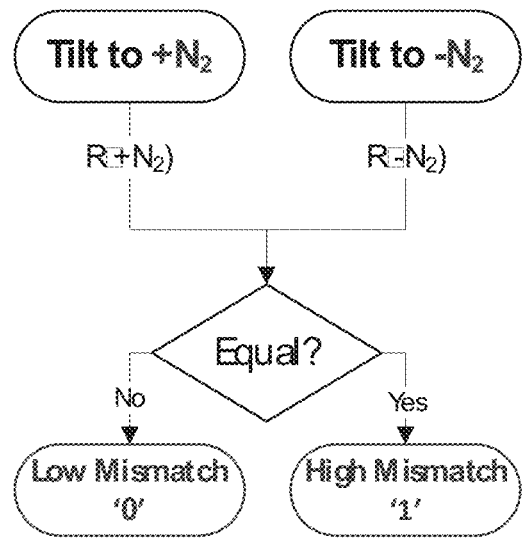
FIG. 4 illustrates an adaptation of the preselection test process to a new PUF. wherein $N_2$ is the tilt magnitude for the new PUF generation, in accordance with an embodiment of the invention.

To generate the new PUF data, the cells are divided into three disjoint segments, as in FIG. 3B. (It is noted that the invention can be carried out for two or more segments). The limits between the segments correspond to tilt values of $\pm N_2$. $S_{-1}$ holds cells with a high negative mismatch, $S_0$ holds cells with a low absolute mismatch and $S_1$ holds cells with a high positive mismatch. For the new PUF, the response of cells that belong to $S_1$ or $S_{-1}$ is ideally (ignoring noise effects) '1', and the response of cells of $S_0$ is ideally '0'. The in-field new PUF response generation flow is depicted in FIG. 4, utilizing two evaluations of the cell: one with a tilt of $+N_2$ and the second with a tilt of $-N_2$. If these two evaluations are equal, the absolute size of the inherent mismatch is high, the cell is attributed either to $S_{-1}$ or $S_1$ and referred to as '1'; if the two evaluations differ, then the cell has a low mismatch size, is attributed to $S_0$ and referred to as '0'. This procedure is carried out every time the PUF is evaluated. It is emphasized that this PUF bit is in addition to the bits of the original PUF, and reuses the same hardware to generate another independent bit. The new PUF is named the "Mirror PUF", since it is based on a tilt that is first applied towards one response of the PUF and then mirrored towards the opposite response of the PUF. Note that the Mirror PUF is a response generation scheme which post-processes the exiting PUF circuit response without any architectural changes. The parameter $N_2$ can be referred to as the tilt threshold, which determines the mismatch magnitude.

To show that the responses of the Mirror PUF and the original PUF are not correlated, let us consider the original PUF in FIG. 3a and the segmentation in FIG. 3b. Expanding the original PUF to a new PUF may be done with two possibilities. First, a new PUF response that does not ignore the sign of the mismatch could be suggested. In such PUF, each cell is attributed by its segment and its response is a vector v of length n over an alphabet of size 3, e.g., $\{-1,0,1\}$, where cells from segment $S_{-1}$ respond $-1$, cells from $S_0$ respond 0 and cells from $S_1$ respond 1. A second option is a PUF response that considers only the mismatch size, as is proposed herein. This PUF responds a binary vector v' of length n.

For example, a PUF response v may look like the sequence v=(−1,−1,0,1,0,1,1,0,−1,1 . . . ,1)

This PUF response, however, and the response of the original PUF as in FIG. 3a are linked together. Assume, for example, that $N_0=N_2$, then by knowing v one can deduce that the original PUF generated the response u=(0,0,*,1,*,1,1,*,0,1 . . . ,1)

where the stars (*) are ignored. In the opposite direction, by observing the response of the original PUF, say u=(0,0,1,1, 1, . . . ), one can gain some knowledge on the response of the new PUF v. Therefore, from this point of view, the responses of the two PUFs are correlated and the PUF response in v may not be offered as a new uncorrelated PUF. To make them completely uncorrelated, segment $S_1$ is identified with segment $S_{-1}$, such that only two responses are possible and thus the response vector v becomes v'=(1,1,0,1,0,1,1,0,1,1 . . . ,1).

This way, the linkage is broken and the PUFs are uncorrelated. Note that there are other ways to reduce the correlation; e.g., by multiplying the response vector by a matrix over an alphabet of size 3.

Notice that the original PUF response vector u and the new PUF response v' are of different lengths. Section III explains how to set the thresholds and make the probability of each symbol to appear in the response vector close to uniform.

III. Stabilization and System Considerations

In this section, practical aspects of the Mirror PUF are discussed. It is shown how the Mirror PUF could be integrated in a full PUF system in parallel to the original PUF.

A. Stabilization

Two major factors contribute to instability of the Mirror PUF. Firstly, PUF bits whose mismatch is close to the applied tilt magnitude $N_2$ may appear as having a high mismatch in some evaluations and a low mismatch in others. Secondly, a similar tilt configuration may have a different influence under alternative V/T conditions, which will "flip" the value of the PUF bit.

Figure 5:
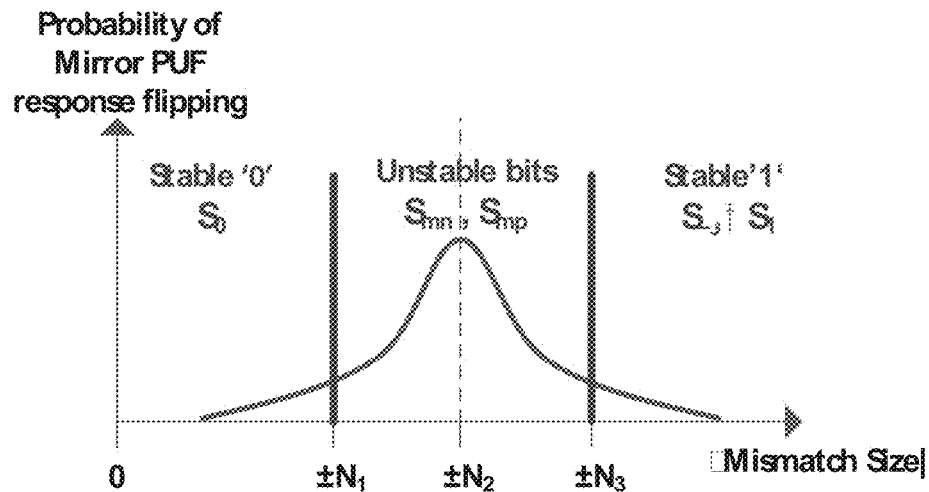
FIG. 5 illustrates an embodiment of the invention of stabilization of the Mirror PUF: bits with absolute mismatch close to $N_2$ are unstable for the Mirror PUF, as they can be evaluated as having either a high or a low mismatch, i.e., they have a high Mirror PUF flip probability. Therefore, bits with mismatch size between $N_1$ and $N_3$ are considered as unstable and masked from the Mirror PUF output.

While for data generation the cells are divided to three segments, an embodiment of the invention extends the tilt preselection concept to the Mirror PUF by dividing the cells to five segments, $\{S_{-1}, S_{mn}, S_0, S_{mp}, S_1\}$. FIG. 5 shows this segmentation. In this figure, the X axis refers only to the absolute mismatch of the cells, and the Y axis presents the bit-flip probability of the cells for the Mirror PUF, i.e., the probability that a cell is evaluated as having a high mismatch (Mirror PUF '1') in one evaluation, and a low mismatch (Mirror PUF '0') in another. Two segments, $S_{mn}$ and $S_{mp}$, are treated as margins between the used segments, $S_{-1}$, $S_0$ and $S_1$. The cells in $S_{mn}$ and $S_{mp}$ are regarded as unstable and masked from the Mirror PUF response. This segmentation is accomplished by running the tilt procedure in two additional tilt magnitudes, $N_1$ and $N_3$, during the preselection testing. Cells in $S_{-1}$ and $S_1$ respond stable '1' bits of the Mirror PUF and cells in $S_0$ respond stable '0's.

Therefore, one tilt magnitude, $\pm N_2$, is used to evaluate the Mirror PUF data in the field. Two additional tilt magnitudes, $\pm N_1$ and $\pm N_3$, are required to generate its stabilization mask during preselection testing, where $N_1 < N_2 < N_3$, as in FIG. 5. Cells with absolute mismatch close to $N_2$ have a high flip probability when used for the Mirror PUF, are attributed to $S_{mn}$ or $S_{mp}$ and are considered as unstable cells. Cells with mismatch size sufficiently lower (in segment $S_0$) or sufficiently higher (in segments $S_{-1}$ or $S_1$) than $N_2$ have a very low flip probability and are therefore considered as stable cells. $N_1$ and $N_3$ are the segments thresholds used to identify the unstable cells and mask their response bits from the output of the Mirror PUF.

Figure 6:
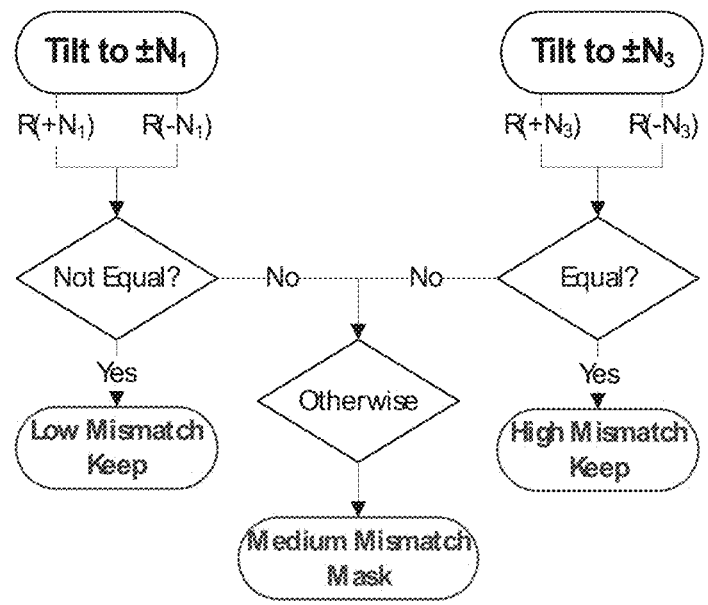
FIG. 6 illustrates a flowchart of the mask generation for the Mirror PUF, in accordance with an embodiment of the invention.

FIG. 6 depicts a flowchart of the mask generation for the Mirror PUF. To identify bits with high mismatch (segments $S_{-1}$ or $S_1$), the cells are tilted to $\pm N_3$, and identical responses indicate a mismatch greater than $N_3$. To identify bits with low mismatch (segment $S_0$), the cells are tilted to $\pm N_1$, and opposite responses indicate a mismatch smaller than $N_1$. Bits that don't fall into one of these categories are regarded as unstable, and are masked from the Mirror PUF response. Note that this mask only qualifies or disqualifies bits, and does not reveal their '1' or '0' state. In the field, in each evaluation the PUF is tilted only to $\pm N_2$ as in FIG. 4.

This mask could be generated in one V/T only and successfully identify the unstable cells across all the applicable V/T conditions. This is required since during in-field PUF evaluations with $N_2$, the V/T condition is not controlled. To accomplish this, $N_1$ and $N_3$ are selected with a sufficient numerical deviation from $N_2$. Note that the mask generation, consisting of four additional PUF evaluations, is done only once if a lifetime of the device, such that the field response generation requires only two evaluations, at $\pm N_2$. Additionally, note that the parameters $N_1$-$N_3$ do not reveal data on the responses of any of the PUFs, the original and the Mirror, and therefore could be treated as a public data.

B. Parameter Selection

A proper selection of the parameters $N_0$-$N_3$ is used not only for achieving the most efficient masking ratio of the original and the Mirror PUFs, which is affected by $N_0$ and $N_1/N_3$, respectively, but also for the Hamming Weight (HW) of the Mirror PUF, affected by $N_2$. An incorrect selection of $N_2$ results with the number of '1's, i.e. bits with mismatch higher than $N_2$, not equal to the number of '0's. Moreover, note that the impact of the tilt test is not necessarily linear, such that, for example, an increment in $N_3$ may disqualify more Mirror PUF cells than a similar decrement in $N_1$.

$N_0$ may be found by measuring multiple PUF devices across multiple operation conditions. An embodiment of the invention finds the best $N_0$-$N_3$ parameters, and applies the parameters to all the fabricated devices. Such a method is also utilized in other types of circuits which require calibration. To find $N_1$-$N_3$ an embodiment of the invention iterates over all the applicable values of these parameters, and finds a set which optimizes the HW and the masking ratio. In mass-production, this parameter selection would be applied to a small sample group in each manufactured lot, and the selected $N_1$-$N_3$ would be used for the rest of the lot. As the process of finding these parameters is done during manufacturing, it does not affect the in-filed device performance. The manufacturing test-time overhead is assumed to be low either, as the parameter selection is performed on a small group only.

C. Masks Storage

Although the data of the Mirror PUF is generated at a tilt of $N_2$ and the mask of the original PUF at a tilt of $N_0$, they are strongly correlated. Assume, for example, a special case where $N_0 = N_2$. In this case, the masked bits of the original PUF are identical to the '0' bits of the Mirror PUF, since the masked bits are the bits with $|\text{mismatch}| < N_0$ and the '0' bits are these with $|\text{mismatch}| < N_2$. Therefore, in this special case, the mask of the original PUF reveals the entire secret of the Mirror PUF. In the general case, $N_0$ may also be greater or smaller than $N_2$, such that the only some of the original PUF's masked bits are '0' bits of the Mirror PUF. But also in the general case, the correlation between the Mirror PUF's masked bits and the Mirror PUF's '0' bits is non-negligible, and increases as the difference between $N_0$ and $N_2$ decreases. Hence, the mask of the original PUF cannot be treated as a public data and must be kept secret. To accomplish this, for the mask of the original PUF, one may use a soft dark bits approach. In this approach, the mask is generated prior to the PUF evaluations, at chip wakeup, and stored in a secure volatile memory, and is thus unavailable to malicious attackers. This approach reduces the usage of the expensive Non-Volatile Memory (NVM) that is otherwise required to store the full mask. A mask generation which utilizes the tilt test requires only two PUF evaluations and is thus more efficient in terms of power and runtime. In contrast to the mask of the original PUF, the mask of the Mirror PUF does not reveal data on any of the two PUFs, because this mask only holds data on the proximity of the mismatch to $N_2$, such that if a cell's mismatch is close to $N_2$, i.e. $N_1 < |\text{mismatch}| < N_2$, the cell is masked. But it does not provide data on whether the mismatch size is greater or less than $N_2$, and therefore does not correlate with the responses of either the Mirror PUF or the original PUF. Hence, it can be treated as a public data. A user could either save it in NVM (i.e., hard mask) or utilize the soft dark bits approach for this mask as well and save the expensive NVM. For mask storage efficiency, we propose the mask to have the same size, in bits, of the PUF array and hold '1' value at the corresponding locations of the qualified bits, and '0' otherwise.

D. Tilt Implementation Aspects and Attack Vectors

In order for the Mirror PUF to be feasible, it may be desired that the preselection test circuitry be fully integrated to the IC. For the Mirror PUF, tilting is done in each evaluation, so these voltages have to be generated on die. As such, the present study of the invention was conducted on the capacitive tilt PUF, as the entire tilting hardware is implemented on-die.

The available range and resolution of the tilt test are also of importance. An insufficient range might result in inability to identify all the unstable cells, and an insufficient resolution may result with HW too far from 50%, as the most optimized spot for $N_2$ may be unachievable.

While no area overhead is required at the bit-cell level, additional area utilization is required at the PUF system level. This includes mask storage circuits, such as NVM or a secure volatile memory if the soft dark bits approach is utilized. Additionally, digital control circuits are required to generate the noisy PUF response from the two±$N_2$ PUF evaluations, as well as for mask application. While these circuits are required for every preselected PUF, a new PUF core is not required for the Mirror PUF. While PUFs with no preselection may not require mask storage circuits, the ECC that is otherwise required incurs a large area utilization, as well as power, runtime, and a lower code rate.

The invention can be made to withstand the so-called Helper Data Manipulation Attack. During this attack, an attacker can modify the mask and be able to compare any two subsequent qualified PUF bits, to conclude whether they are equal or opposite. After running the attack on all the qualified bits, the attacker remains with only two possibilities for the entire PUF key. To counter the attack, a user could utilize the soft dark bits approach, such that the mask is kept hidden and an attacker has no access to it. Another possibility is to add a hash function, and the qualified bits are XORed with the hash value of the mask. This way, any change in the mask results in a change, in average, in 50% of the PUF bits and prevents the attacker from concluding on the state of the bits.

Another attack vector could be to set $N_2$ to its maximal value, thereby achieving a predicted PUF key of all '0'. This may enable the attacker, for example, to enroll with one device and later authenticate with another. While this attack in infeasible for the current implementation of the Capacitive Tilt PUF, where the maximal capacitance is insufficient to tilt all the PUF cells, it may be applicable for future implementation which may have a larger range. As a countermeasure, the PUF device could be programmed to ignore an 'all 0' key, or the value of $N_2$ could be programmed to a fuse to prevent overriding. While other attacks specific to this PUF implementation, e.g., by modifying $N_0$-$N_3$, appear to just corrupt the PUF output without revealing data on the actual PUF response, it is recommended as a precaution to program $N_0$-$N_3$ to fuses such that tampering will be more difficult.

IV. Implementation and Results

This section presents the measured results of the Mirror PUF on the Capacitive Tilt PUF (FIG. 7a). The arrows through the capacitors in FIG. 7a indicate that the capacitance can be variable and programmable. One embodiment would entail having many legs of the capacitor and placing digital switches (not shown) in series with these legs to either connect or not connect them to the nodes of interest. Another embodiment utilizes MOS transistors, controlled by biasing the source and drain to $V_{ss}$ for inversion, a high capacitance or to $V_{cc}$ for depletion, a low capacitance (FIG. 7b). In both of these embodiments the capacitance can be controlled by digital bits, and hence could be referred to as a programmable capacitor. This PUF has the tilt system fully integrated into the PUF array, and no architecture modifications or additional components are required to enable the Mirror PUF. In addition, as the tilting does not require $V_{cc}$ change, no level shifter is required. The PUF was fabricated in TSMC 65 nm in arrays of 800 bits, as shown in FIGS. 8A-8C, and measurements of 16 arrays, each from a different chip, (12,800 bits) are presented. The simulated energy/bit is 23 fJ for each of the two required PUF evaluations at 1.1V and 50° C., 46 fJ/bit in total.

To assess the efficiency of a preselection test on a PUF, three steps may be used.

1. The stability of the bits is decided after multiple evaluations across all the applicable V/T conditions.

2. For each bit, it is checked if the preselection test identifies it as stable.

3. The results are analyzed and the relative portions of qualified unstable cells and disqualified stable cells are calculated for each applicable tilt magnitude.

Note, that to optimize the preselection test, it is desired to minimize the amount of "qualified unstable" bits, which are the unstable bits that pass the test and are used in the PUF response. It is also desired to minimize the "disqualified stable" bits in the test, so that a greater percentage of stable bits remain in the array after preselection.

For the Mirror PUF, there are three degrees of freedom as $N_1$, $N_2$ and $N_3$ can be determined, and that for this PUF, also the HW has to be optimized. The results in this section represent a hard mask, where a mask is generated in a single V/T but identifies unstable bits across all the V/T conditions. This scheme is more difficult to accomplish than a soft mask, where the mask could be generated at the same V/T of the PUF evaluation. Thus, the hard mask better demonstrates the strength of the Mirror PUF.

Figure 9:
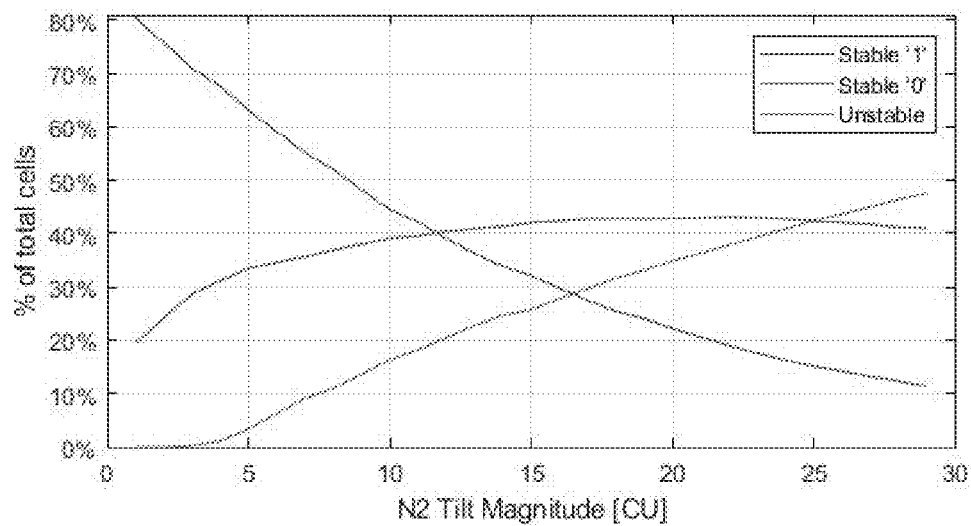
FIG. 9 illustrates measured relative portions of Stable '1', Stable '0' and Unstable cells for all applicable $N_2$ values.

The states of cells for the Mirror PUF, either stable '1', stable '0' or unstable, were determined for each applicable value of $N_2$, from one Capacitive Unit (CU) to 29 CU. The bits were evaluated across 12 V/T corners, [1.1V, 1.2V, 1.3V, 1.4V]×[-10° C., 50° C., 85° C.], 500 evaluations in each, 6,000 evaluations in total. A temperature of 50° C. was selected as the nominal condition, since in an actual product, this is expected to be the die temperature under standard operation conditions due to self-heating. 85° C. is the highest temperature that could be obtained without damaging the setup. Recall that one Mirror PUF evaluation consists of two raw evaluations, with ±$N_2$, a '0' response is obtained when the two raw evaluations differ and a '1' response is obtained when the two raw evaluations equal. A bit was considered as stable if it provided the same response in all the 6,000 evaluations, across the different V/Ts. The results for all the applicable $N_2$ values are depicted in FIG. 9. The number of '1' bits, i.e. the number of bits with mismatch higher than $N_2$, decreases with a larger $N_2$, while the number of '0' bits increases. For low $N_2$ values, where the tilt impact is low, the number of unstable cells is low, while at higher $N_2$ it increases due to the varying tilt impact across V/T. For $N_2=15$, the HW is 49%, closest to 50% and thus it is the most suitable $N_2$ to measure the Mirror PUF's native instability. The native portion of unstable cells is 42.1% and the native BER is 8.6%.

Figure 10:
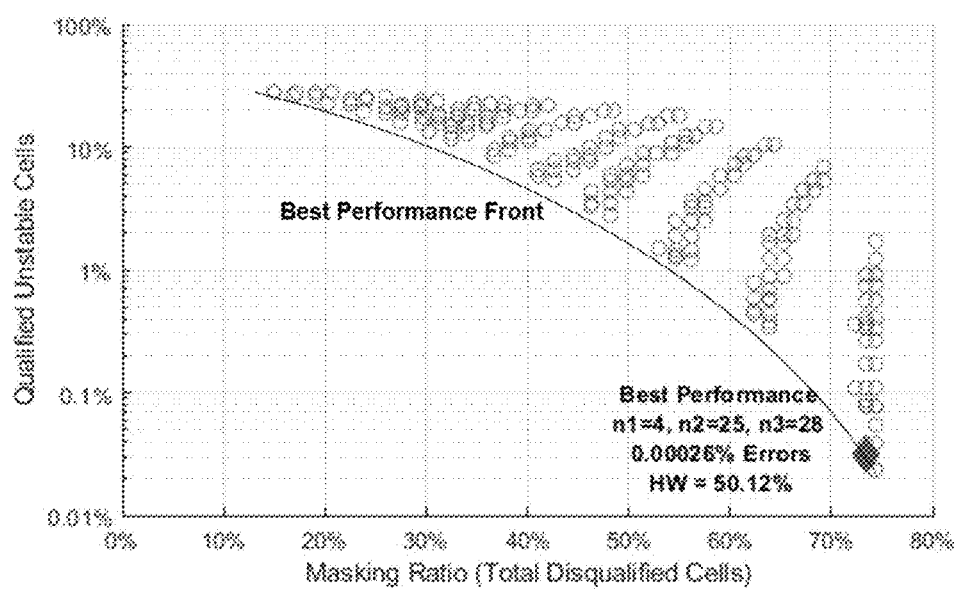
FIG. 10 illustrates the measured preselection test results over the Mirror PUF. Each point represents the test results for a different combination of $[N_1, N_2, N_3]$ threshold levels.

The preselection test was conducted in one V/T only, 1.4V/50° C. For each $N_2$ value, all the available $N_1$ and $N_3$ values were swept such that the PUF metrics were calculated for all the legal [$N_1$, $N_2$, $N_3$] combinations. FIG. 10 presents the results of all the [$N_1$, $N_2$, $N_3$] combinations with 48%<HW<52%, where each data point represents one combination of [$N_1$, $N_2$, $N_3$]. The instability information was obtained based on the combined measurements of all the 12 V/Ts. The best performance was achieved for [4,25,28], with HW=50.1% and a masking ratio of 73%. Only four unstable cells (0.03% of the measured cells) were qualified. The reason for the relatively high "best $N_2$" is explained in the appendix.

The BER of the Mirror PUF was calculated in two different methods. In the first method, the reference response was taken in typical condition, 1.2V/50° C., and the individual BERs were calculated for each measured V/Ts relative to this reference (Table I). The overall PUF BER is the worst case of these BERs, 2.35E-5. The second method assumes an equal probability for operating in each of the V/Ts, and BER is thus the ratio of errors from the entire measurements. The BER according to this method is 2.6E-6 (21 erroneous evaluations in 8.2M evaluations of 3,404 qualified cells).

TABLE I

MEASURED ERROR RATES FOR EACH V/T

| T | V | | | |
|---|---|---|---|---|
|  | 1.1 V | 1.2 V | 1.3 V | 1.4 V |
| −10° C. | 2.35E−05 | 0 | 0 | 0 |
| 50° C. | 0 | 0 | 0 | 0 |
| 85° C. | 0 | 0 | 0 | 7.34E−06 |

For users who are willing to compromise the number of qualified-unstable cells for masking ratio, such that overall, more cells are qualified, but together with more unstable cells, a 'best performance' front is plotted in FIG. 10, where the lowest number of qualified unstable cells is obtained for a given masking ratio. The points in FIG. 10 tend to converge to clusters, according to the deviation between $N_1/N_3$ and $N_2$. Since the resolution of the tilt test is limited, an increase in this deviation, especially for higher, more aggressive masking ratios, results in a gap in the plot, such that clusters of points are observed.

The mask generation was done at $V_{cc}$ of 1.4, since the implemented MOS capacitors have the highest 'on' to 'off' capacitance ratio at higher gate voltages, and thus the test has the highest impact and the best performance. Another embodiment might consider placing metal capacitors or MOS capacitors with low threshold voltage to optimize for lower voltages.

Figure 11A:
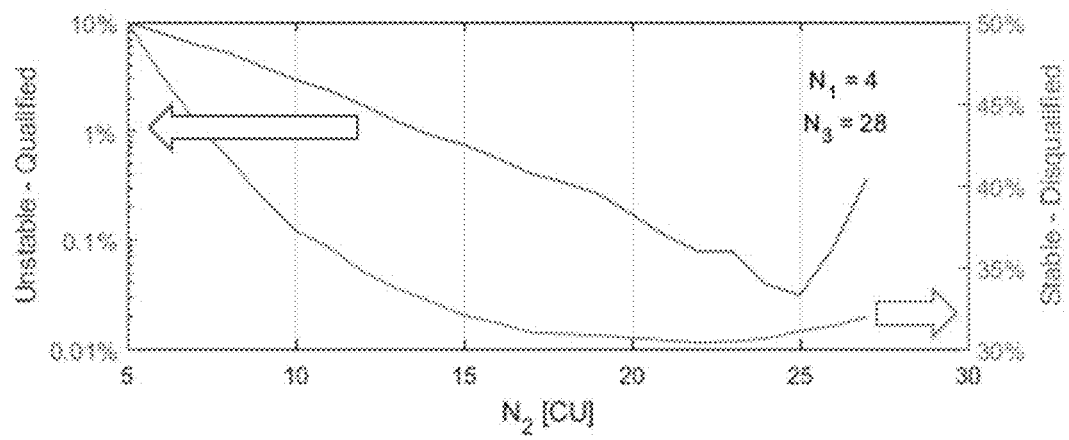
FIGS. 11A and 11B illustrate measured PUF parameters for different $N_2$ values, when $N_1=4$ and $N_3=28$.
Figure 11B:
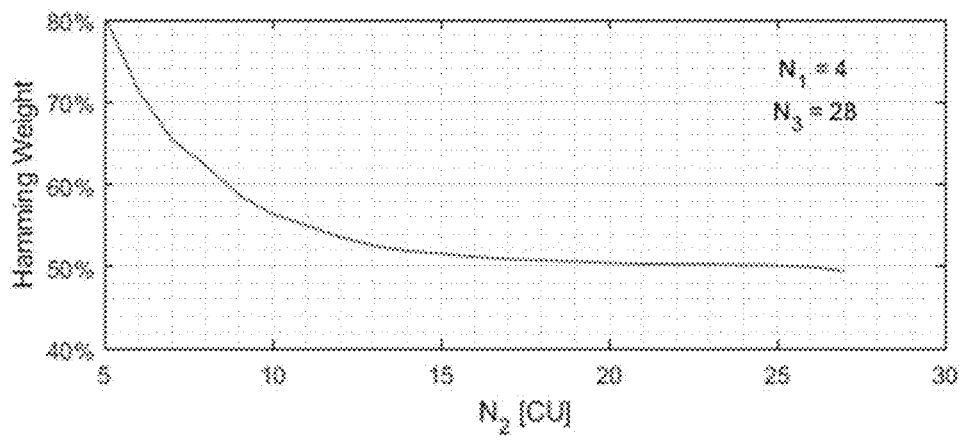

The best $N_1$ and $N_3$ are found to be close to the ends of the capacitance range to enable the aggressive filtering that is required given the high portion of unstable cells. FIGS. 11A-11B depict a sweep of $N_2$ between $N_1$ and $N_3$, when these are kept at their best values, 4 and 28, and the analyzed cells are the 3,404 qualified cells for these $N_1$ and $N_3$. Depending on the value of $N_2$, cells may change their status from '1' to '0' and from stable to unstable. In FIG. 11a, the qualified unstable cells and the disqualified stable cells are plotted, and FIG. 11b depicts the HW of the qualified cells for different $N_2$ values. Note that $N_2$ has a minor effect on the HW for values close to its best value. The characteristics of the three curves are associated with the high $V_{cc}$ used for the generation of the mask and explained in detail in the appendix. (For example, the reasons why the minimums of the qualified unstable cells and the disqualified stable cells in FIG. 11a are observed at relatively high $N_2$ values are explained there).

Figure 12A:
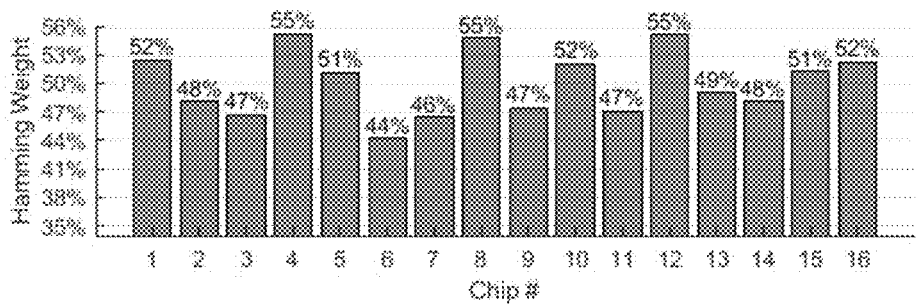
Figure 12B:
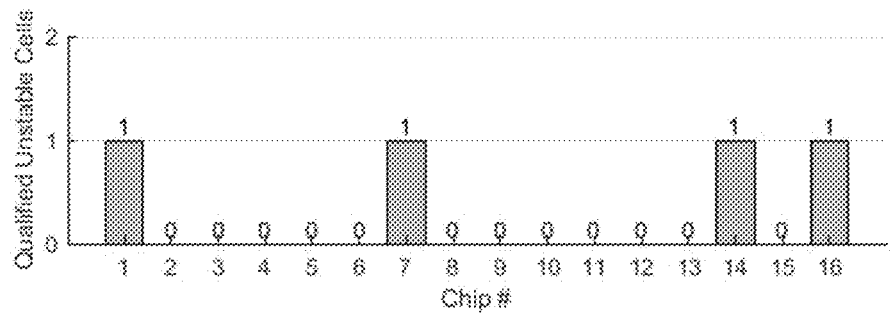
Figure 12C:
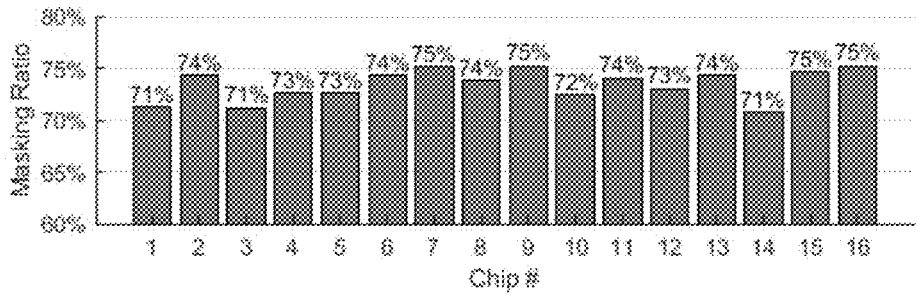

For the selection of [$N_1$, $N_2$, $N_3$] in mass-production, Section II.B proposes to derive these values from a limited number of measured devices in each manufactured lot and apply these values to the entire lot. To verify that this could work, the important metrics from each measured chip are analyzed (FIGS. 12A-12C). The HW for the individual PUF arrays, in FIG. 12a, ranges between 44% and 55%. Its standard deviation is 3.4%, as is expected from true random data. True random PUF data is expected distribute binomially, with a variance given by Var(X)=np(1−p) [32], where n is the number of used PUF cells and p is the '1' probability, 50% for an ideal PUF. In this case, n≈200 due to a masking ratio of about 75%. Therefore Var(X)=50 and the ideal σ(X)=3.54%. The four qualified unstable cells are found in four different arrays (FIG. 12b), and the masking ratio, in FIG. 12c, is about 71%-75% for all the chips. Overall, no outlier characteristics were demonstrated in any of the measured chips. This hints on a similar behavior also in a larger population of chips, e.g., in a full lot. Thus, it should be feasible to extract the values of [$N_1$, $N_2$, $N_3$], from a smaller sample group (several hundreds), and apply these values to an entire lot, which can number in the millions. To further indicate on the validity of the proposed method, the best $N_1$-$N_3$ were extracted from an arbitrary half of the measured dies, applied to the second half of the chips, and the important metrics of that half were extracted. Then, the procedure was repeated for the second half. The results from the first half are [$N_1$, $N_2$, $N_3$]=[4,24,28] and the metrics of the second half with these $N_1$-$N_3$ are HW=50.3% and % Errors=0.00062%, very close to the results from all of the dies. The results from the second half are [$N_1$, $N_2$, $N_3$]=[4, 25,28], identical to $N_1$-$N_3$ for all the arrays. The calculated metrics, when applied only to the first half, are HW=49.94% and % Errors=0.00015%.

Figure 13:
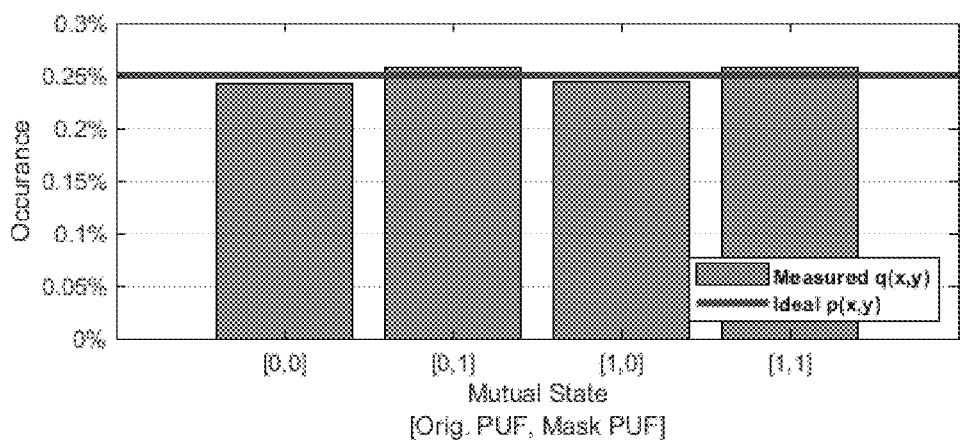
FIG. 13 illustrates Measured and ideal probabilities of mutual states between the original PUF and the Mirror PUF.
Figure 14:
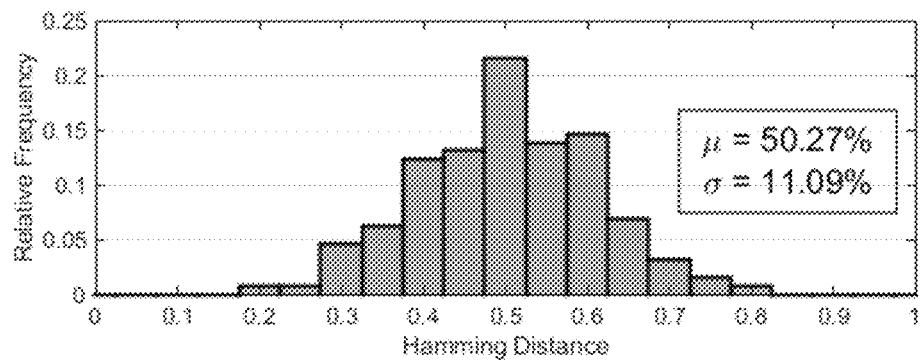
FIG. 14 illustrates Measured Hamming Distance between the qualified bits of the original PUF and these of the Mirror PUF, for 20-bit words.

In order to illustrate the independence between the original PUF and the Mirror PUF, let us consider the Kullback-Leibler Divergence ($D_{KL}$). $D_{KL}$ provides the relative entropy in bits, or the difference between two probability distributions, denoted by:

$$D_{KL}(P\|Q) = -\sum_{n \times m} p(x, y) \log_2 \frac{q(x, y)}{p(x, y)} \quad (1)$$

where x∈X, y∈$\mathcal{Y}$ are the random variables read from the original and the Mirror PUFs, respectively, $$p(x, y) = \frac{1}{|X| \cdot |\mathcal{Y}|}$$

is the probability of two independent uniformly distributed random variables, and q(x, y) is the measured probability. In our case, both alphabets, X and $\mathcal{Y}$, are of size 2, hence p(x,y)=¼. The measured probabilities q(x,y) were obtained from the qualified bits of each chip, such that only the first bits of the PUF that had a larger number of qualified bits were taken. As depicted in FIG. 13 for 2571 qualified bits, q(Orig. PUF=0, Mirror PUF=0)=24.2%, q(0,1)=25.7%, q(1, 0)=24.4% and q(1,1)=25.7%. Therefore, $D_{KL}$=0.00057 random bits. This supports the theoretical analysis that the two PUFs are statistically independent; i.e., the two response vectors are uncorrelated. In addition, the average measured Hamming Distance (HD) between the Mirror PUF and the original PUF is 50.3%, very close to the ideal of 50%, as shown in FIG. 14 for 20-bit words.

Figure 15:
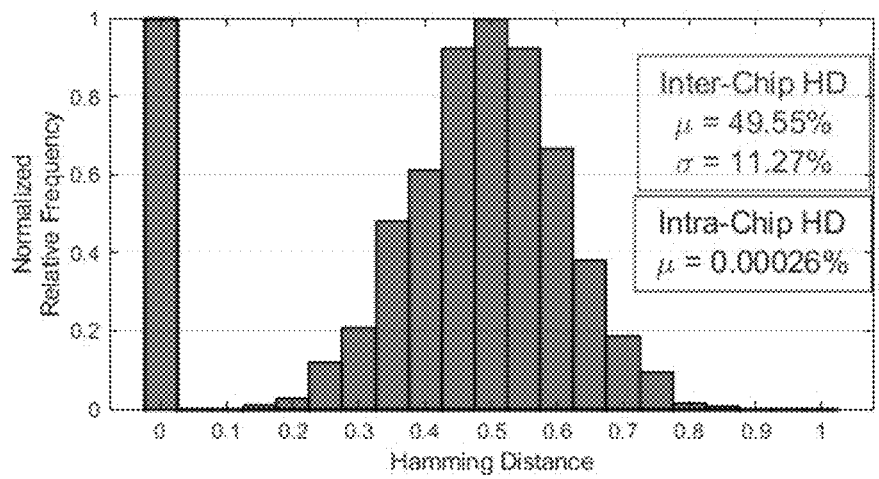
FIG. 15 illustrates Measured Inter- and Intra-chip HD of the qualified bits of the Mirror PUF, for 20-bit words.
Figure 16:
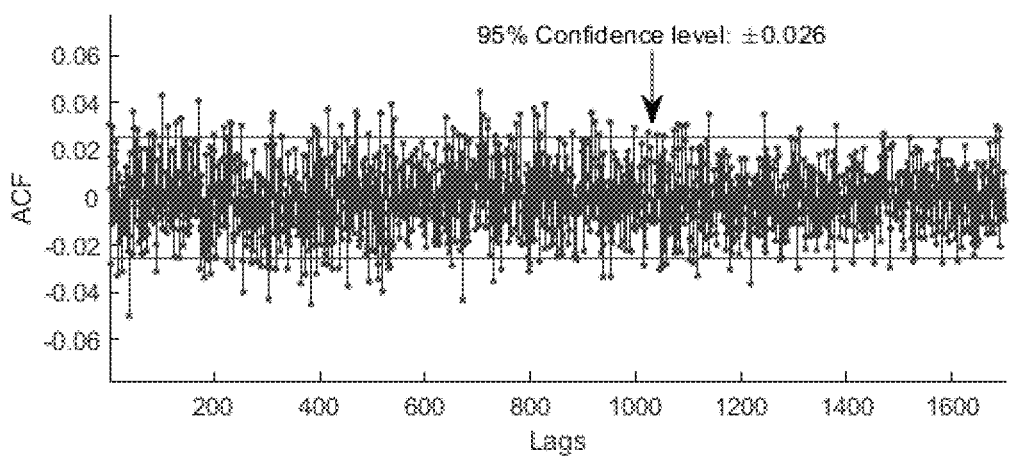
FIG. 16 illustrates Measured Auto-Correlation Function of the qualified bits of the Mirror PUF.

Other uniqueness and the randomness metrics of the Mirror PUF are demonstrated for the 3404 qualified bits. The inter-chip HD demonstrates a near-perfect uniqueness with an average of 49.6%. FIG. 15 presents the inter- and intra-chip HD for words of 20 bits. The standard deviation of the inter-chip HD depends on the number of bits in the analyzed words. The Auto-Correlation Function (ACF), in FIG. 16, does not exhibit any significant correlation between bits at any lag, and thus does not demonstrate any spatial correlation between the qualified bits. The randomness of the data was confirmed by the NIST (National Institute of Standards and Technology) randomness tests, executed on three bitstreams with 1024 qualified bits in each. Nine of the tests are applicable for the limited number of measured qualified bits, and all of them passed, as depicted in Table II.

One advantage of the Mirror PUF is that it requires no additional area at the bit-cell level assuming the capacitive tilt PUF is instantiated, as it reuses the same core circuits of that PUF. The masking ratio is somewhat increased over other works, including the capacitive tilt PUF, implying a larger requirement for mask storage circuits, such as NVM, for each qualified bit. However, the logic circuits controlling the Mirror PUF operation, such as those required to fetch and apply the mask, may be shared with the original PUF.

The other metrics of the PUF, such as its BER, energy, HW and HD are better or on a par with the other state of the art PUF works. Its BER is sufficiently low to require only a very lightweight ECC. No correlation was demonstrated between the PUF bits, either adjacent bits or across dies. The PUF responses stands the standard randomness NIST tests. The Mirror PUF is also shown to be uncorrelated with the capacitive tilt PUF. The proposed method to select its essential parameters, $N_1$-$N_3$, is shown to be feasible and coherent. This PUF has no specific usage constraints apart from the preselection requirements, and therefore useful for any PUF application, such and encryption, key generation, identification and authentication.

As the useful cells' ratio (i.e., 1-masking ratio) of the capacitive tilt PUF is 41% and of the Mirror PUF is 27%, the number of the qualified bits is increased by 66% for a given number of manufactured cells, or the number of manufactured cells could be reduced by 40% for a given number of required qualified cells.

TABLE II

NIST TESTS RESULTS FOR 3X1024 MEASURED QUALIFIED BITS

| Test Name | Average P value | Pass % in 3 runs (p > 0.01) |
|---|---|---|
| Frequency | 0.26 | 100% |
| Block Frequency | 0.2 | 100% |
| Runs | 0.45 | 100% |
| Longest Run | 0.8 | 100% |
| Cumulative Sums | 0.3 | 100% |
| FFT | 0.25 | 100% |
| Non-overlapping Templates (m = 4) | 0.35 | 100% |
| Serial (m = 8) | 0.63 | 100% |
| Approximate Entropy (m = 4) | 0.58 | 100% |

V. Conclusion

Preselection tests of PUFs, originally designed to indicate the internal mismatch amount within the cells and consequently their stability, could be reused as an additional PUF. These tests typically add an artificial mismatch that counters the internal mismatch of the PUF cells, such that cells that overcome the imposed mismatch are considered as stable. Herein we note that the amount of artificial mismatch required to overcome the internal mismatch could also be viewed as a measure to the size of the internal mismatch. Since the absolute amount of internal mismatch is random and not correlated with the PUF response, it could be viewed as another entropy source, and more PUF bits could be generated by utilizing the measured internal mismatch size. One PUF cell could generate two data bits, the first being its original response and the second represents its mismatch amount, such that a high mismatch size translates to '1' and a low mismatch size to '0'. This new PUF concept is called the Mirror PUF.

The concept is further developed to mask unstable cells from the Mirror PUF response. Such cells have a medium mismatch and can therefore flip their Mirror PUF response between subsequent reading. At some readings they may appear as having a large mismatch and at others, a low mismatch. These cells are identifiable by the same preselection test after a proper selection of test thresholds, such that a mask is generated and these cells are disqualified from the Mirror PUF response. Thus, the Mirror PUF uses also cells that were masked from the original PUF, since unstable cells for the original PUF could represent stable bits of the Mirror PUF.

The concept could be applied to any preselection PUF which has the test integrated to the PUF, if the test has enough range and resolution. If the preselection test is entirely integrated to the PUF, no architecture changes or additional custom analog blocks are required. Outside of the bit-cell level, an addition of NVM or another mask storage memory is required, as well as an inexpensive post processing digital circuit. As analyzed in [1], these additions may be preferred by the users over traditional ECC methods, as the preselection is much more efficient than in the aspects of code rate, runtime, power, and area of the error-reduction circuits.

An application of the Mirror PUF to the existing Capacitive Tilt PUF demonstrates the feasibility of the Mirror PUF. A parameter sizes selection process could be carried out for a small group of devices and the sizes could be applied to the entire group, to yield a high quality PUF. The Mirror PUF yields an addition of 66% cross-V/T stable bits to the Capacitive Tilt PUF's stable bits. The fraction of errors measured in these bits is 2.6E-6, with BER of 2.35E-5 for the worst-case V/T. The Mirror PUF is shown to be uncorrelated to the capacitive tilt PUF, and its other measured parameters, such as randomness and uniqueness, are shown to match the standards required by an industrial PUF.

No additional area overhead is required at the bit-cell level, and the only limitation is that the mask of the original PUF is now a part of the PUF secret, such that a soft masking scheme or another method is required.

APPENDIX

This appendix explains the characteristics of FIGS. 11A-11B, which show a best $N_2$ at a CU value close to $N_3$. To do so, we observe the behavior of the PUF cells for the different applicable $N_2$ values. For clarity only, noise and temperature effects are neglected in this explanation, as empirically, the most prominent effect on the mismatch measurements is of the supply voltage. While the actual mismatch of each cell is constant (in this aspect, we define the "actual mismatch" as the mismatch in typical conditions), across the different supply voltages, each PUF cell is given different mismatch measures by the tilt test, as the measurement units, i.e., the capacitors, vary. The measured mismatch for a high tilt $V_{cc}$ is denoted as $N^{HV}$, and for a low tilt $V_{cc}$ as $N^{LV}$. In this implementation, $N^{HV}$ is always smaller than $N^{LV}$. This is because the high $V_{cc}$ results in a higher capacitance for a given number of CUs, such that fewer CUs are required to flip the output between the evaluations. This $V_{cc}$ dependence is due to the fact that inversion capacitance is used. In other words, one Least Significant Bit (LSB) for a high $V_{cc}$ is larger than one LSB for a low $V_{cc}$ and therefore $N^{HV} < N^{LV}$. Note that each cell has its specific $N^{HV}$ and $N^{LV}$, which correspond to its mismatch size, and this is in contrast to $N_{1-3}$ which are constant to the PUF.

Since a cell flips its Mirror PUF response in tilt values between $N^{HV}$ and $N^{LV}$, the range of $N_2$ values where it is unstable is $N^{HV} \le N_2 \le N^{LV}$. For a given cell, if $N_2$ is selected such that $N_2$ is smaller than this cell's $N^{HV}$ it always responds '1' (high mismatch), while for $N_2$ larger than this cell's $N^{LV}$, it always responds '0' (low mismatch). For $N_2$ such that $N^{HV} \le N_2 \le N^{LV}$, the cell is unstable: for a high $V_{cc}$ it responds '0' and for a low $V_{cc}$, '1'. The range between $N^{HV}$ and $N^{LV}$ is therefore denoted the "instability range" of the cell, and this range is specific to each cell. For example, let us consider two cells, as depicted in FIG. 17. Cell #1 has an instability range between 1 and 3 CU, and cell #2's instability range is 21-27 CU. If $N_2$ is chosen as 25, cell #1 is a stable '0', as $N_2$ is outside of its instability range and larger than its $N^{LV}$, such that the two evaluations of the cell in tilts of $\pm N_2$ always result in two opposite responses (FIG. 4). Cell #2 is unstable, as $N_2$ is within its instability range: for a high $V_{cc}$, the evaluations in $\pm N_2$ have opposite responses, as the induced tilt is sufficiently strong to overcome the mismatch, and for a low $V_{cc}$, the induced tilt is too weak and the responses are identical.

As explained in Section IV, the mask generation is done at a high $V_{cc}$, where the tilt impact is larger. Therefore, the mismatch of each cell viewed by the tilt test during the mask generation is approximately its $N^{HV}$, the lower boundary of its instability range. Therefore, during the mask generation the cells are binned to three segments, according to their $N^{HV}$: $N^{HV} \le N_1$, $N_1 < N^{HV} < N_3$ and $N_3 \le N^{HV}$. This implies that a cell is disqualified, approximately, if its $N^{HV}$ is between $N_1$ and $N_3$. In the example in FIG. 17, cell #1 is therefore qualified, as its $N^{HV}$ is smaller than $N_1$ and cell #2 is disqualified.

FIG. 18 illustrates different possibilities for instability ranges, relative to $N_1$ and $N_3$. The red bars along the x-axis show the instability range of one cell given as an example, between its $N^{HV}$ and $N^{LV}$, while the purple triangles show the stable/unstable status of the cell for different applicable $N_2$ values. Recall that the preselection test qualifies cells whose mismatch is smaller than $N_1$ or larger than $N_3$, and disqualifies cells with $N_1 <$ mismatch $< N_3$ (see FIGS. 5 and 6). In FIG. 18a, bit-cells with low mismatch are illustrated, such that $N^{HV} \le N_1 \le N^{LV}$. Such cells are qualified, since their $N^{HV} < N_1$, yet if $N_2$ is also smaller than their $N^{LV}$, the cells are unstable as $N_2$ resides in their instability range. For this reason, lower $N_2$ values result in more unstable-qualified cells, such as the cell illustrated in FIG. 18a, and this explains the increase of unstable-qualified cells in FIG. 11a for low $N_2$ values. In FIG. 18b, bits-cells with medium mismatch are illustrated. These cells are disqualified, since $N_1 < N^{HV} < N_3$, and depending on the selected $N_2$, they may be stable or unstable. FIG. 18c shows cells with high mismatch, such that their $N^{HV}$ approaches $N_3$. As their $N^{HV} < N_3$ these cells are disqualified, but for lower $N_2$ values, when $N_2 < N^{HV}$, they are stable, and this explains the increase in the number of stable-disqualified cells for lower $N_2$ seen in FIG. 11a.

The increase in the HW for low $N_2$ values (FIG. 11b) could also be explained by FIG. 18c. The disqualified stable cells in these $N_2$ values are generally cells with mismatch higher than $N_2$, which respond '0'. Therefore, more '1' cells remain and the HW increases.

Summary of Concepts Used in the Invention

Let us begin from an ideal PUF, where no instability exists. In other words, assume that our tilt test, or the mismatch measurement, always provides the same result.

There are two ways to add more bits to the PUF cells.

Figure 19A:
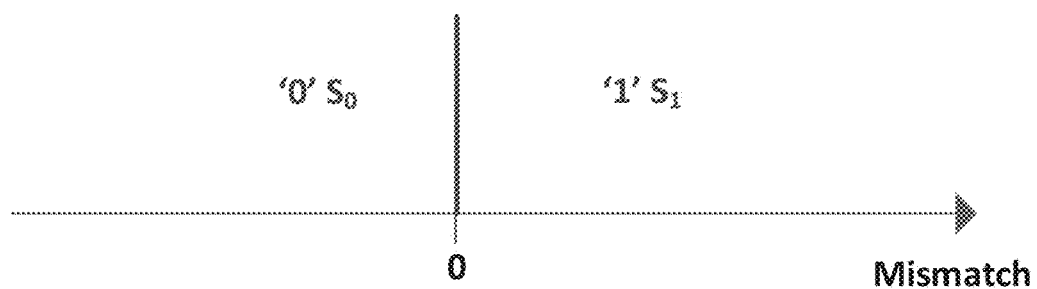
FIGS. 19A-19H illustrate concepts used in the invention in adding more bits to the PUF cells.

The first way is in accordance with an embodiment of the invention and is shown in FIG. 19A. For the first PUF bit, we segment the cells according to their mismatch polarity: S0 are '0' and S1 are '1'

Figure 19B:
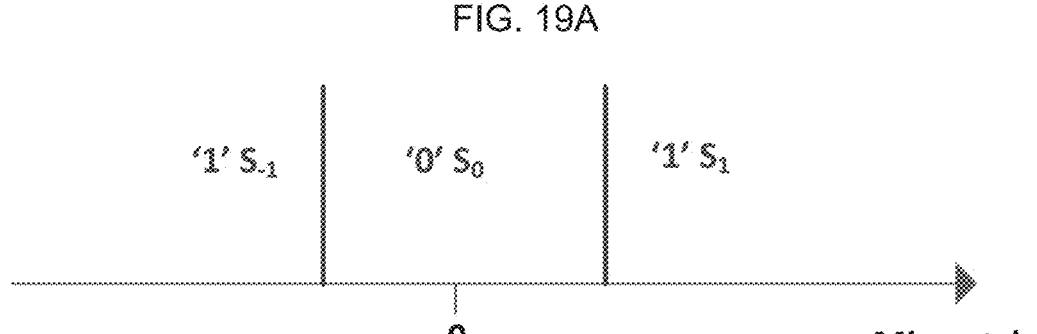

For the second PUF bit, we view only the mismatch magnitude and ignore the polarity, as shown in FIG. 19B.

Figure 19C:
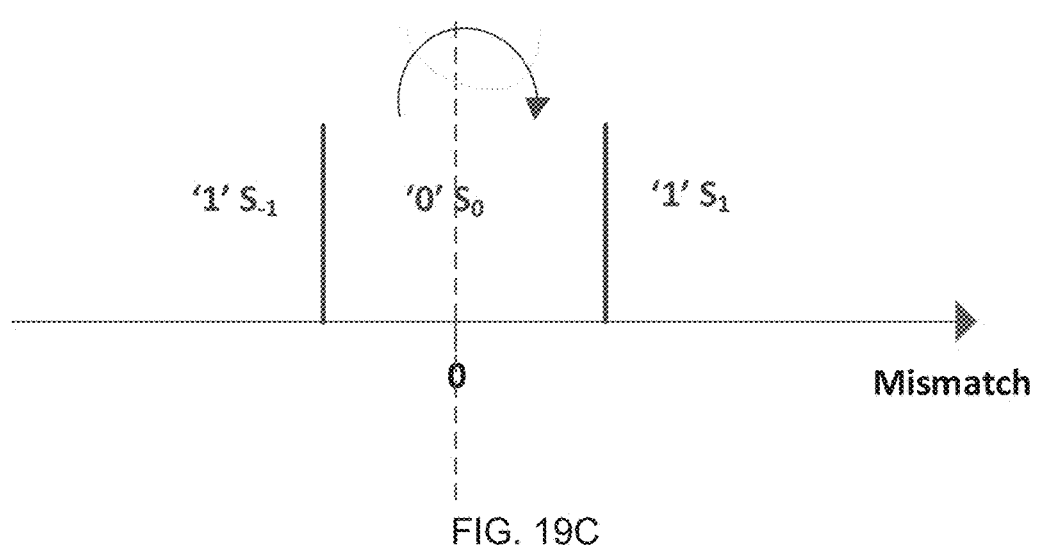
Figure 19D:

This is equivalent to 'folding' the previous plot on X=0, as shown in FIG. 19C, which results in the plot shown in FIG. 19D.

Figure 19E:
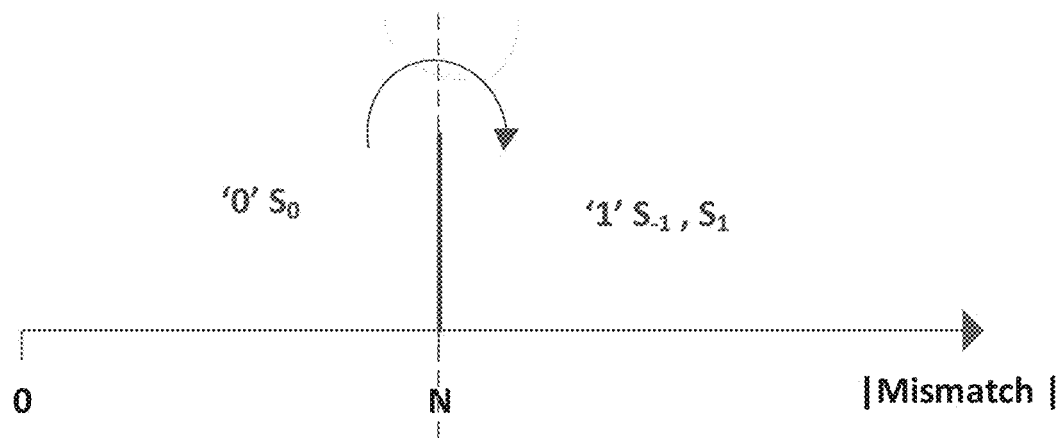
Figure 19F:
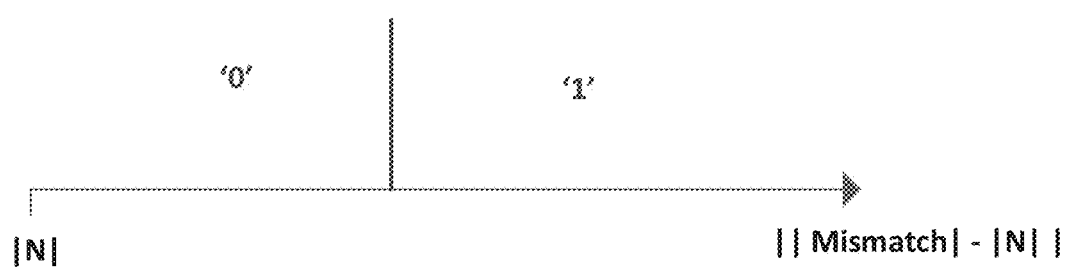

For the third PUF bit, we repeat the same procedure. We 'fold' the previous plot over X=|N| and decide the bit's value depending on the distance of the bit's (absolute) mismatch from |N|, as shown in FIG. 19E, which results in the plot shown in FIG. 19F.

This process could be repeated to obtain more bits.

The second way to add more bits is to segment the cells according to their mismatch.

Figure 19G:
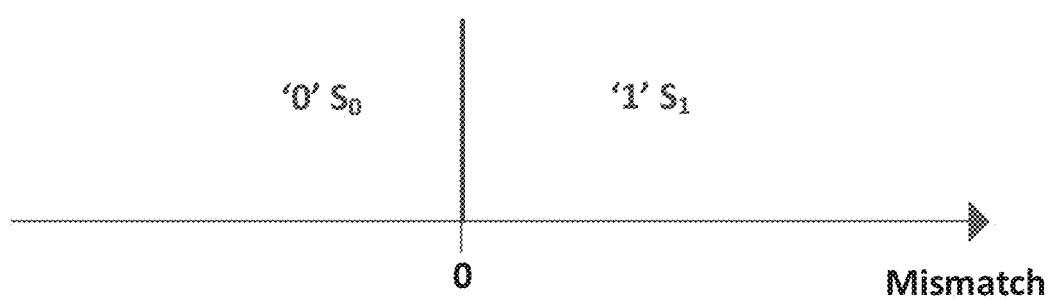
Figure 19H:
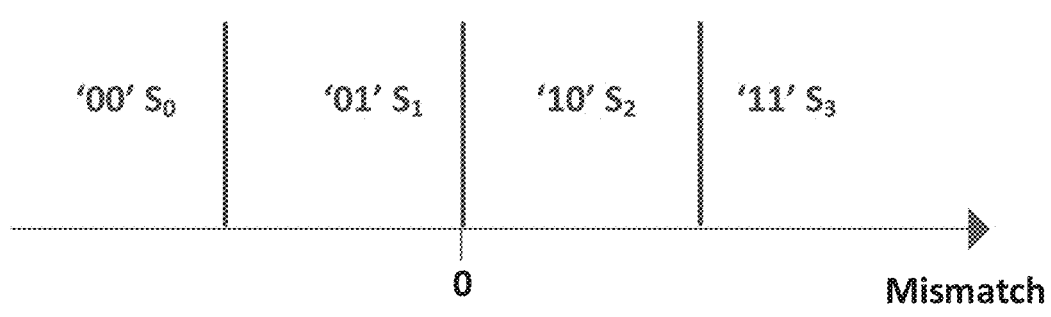

For 1-bit cells, one may segment the cells to two bins as seen in FIG. 19G. For 2-bit cells, one may segment the cells to four bins, etc., as seen in FIG. 19H.

What is claimed is:

1. A method for creating a physical unclonable function (PUF) bit for use with transistor circuitry comprising:
    performing a tilt test on a physical unclonable function (PUF) cell of a transistor circuitry, comprising tilting said PUF cell at least once, and comparing a mismatch magnitude of said PUF cell to a tilt threshold;
    determining a magnitude of said mismatch, wherein a mismatch magnitude below said tilt threshold is considered a first logic value and a mismatch magnitude above said tilt threshold is considered a second logic value, and
    wherein said mismatch magnitude of said PUF cell is random; and using said absolute value of said mismatch magnitude as an entropy source to produce at least one PUF bit called a mirror PUF bit.

2. The method according to claim 1, wherein the polarity of the mismatch determines an additional bit.

3. The method according to claim 1, wherein responses to tilting of said mirror PUF bit based on the mismatch magnitude and said PUF cell are not correlated.

4. The method according to claim 1, wherein the PUF cell comprises an SRAM (static random access memory)-based PUF.

5. The method according to claim 1, further comprising performing the tilt test on more than one PUF cell, and segmenting said PUF cells into at least two segments according to their mismatch magnitude.

6. The method according to claim 1, further comprising performing the tilt test on more than one PUF cell, and segmenting said PUF cells into distinct zones to disqualify unstable cells.

7. The method according to claim 1, comprising tilting said PUF cell at least twice, whereby the PUF is tilted by an amount N2 in a positive direction to obtain a first response, and then tilted by N2 in a negative direction to obtain a second response, wherein if the first response and the second response are equal, then the mirror PUF bit is deemed a first logic value and if the first response and the second response are different, the mirror PUF bit is deemed a second logic value.

8. The method according to claim 7, wherein the first logic value is a logic "1" and the second logic value is a logic "0".

9. The method according to claim 1, wherein the first logic value is a logic "0" and the second logic value is a logic "1".

10. The method according to claim 7, wherein a preselection test is performed using tilt magnitudes N1 and N3, such that $|N1|\leq|N2|\leq|N3|$, and wherein said PUF cell is first tilted to $\pm N1$ to yield third and fourth response and then tilted to $\pm N3$ to yield fifth and sixth response, and if the $3^{rd}$ and $4^{th}$ responses are not equal or the $5^{th}$ and $6^{th}$ responses are equal, then the mirror PUF cell is considered stable, and if the $3^{rd}$ and $4^{th}$ responses are equal or the $5^{th}$ and $6^{th}$ responses are not equal, then the mirror PUF is considered unstable.

11. The method according to claim 1, wherein the tilting is accomplished by varying a programmable capacitor.

* * * * *